US006489617B1

(12) United States Patent
Fisher et al.

(10) Patent No.: US 6,489,617 B1
(45) Date of Patent: Dec. 3, 2002

(54) QUALITY ASSURANCE FLOOD SOURCE AND METHOD OF MAKING

(75) Inventors: Darrell R. Fisher, Richland; David L. Alexander, West Richland, both of WA (US); Stanley Satz, Surfside, FL (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/420,313

(22) Filed: Oct. 18, 1999

(51) Int. Cl.$^7$ ......................... G01T 1/164; G01T 1/161; H05H 00/00; G21F 5/02; G21G 4/00

(52) U.S. Cl. ........................... 250/363.02; 250/363.04; 250/363.09; 250/252.01; 250/378; 250/496.1; 378/120; 252/644

(58) Field of Search ....................... 250/363.02, 363.04, 250/363.09, 252.01, 378, 496.1; 378/120; 252/644

(56) References Cited

U.S. PATENT DOCUMENTS 4,033,884 A * 7/1977 Lorch et al. ............. 250/496.1
4,164,492 A * 8/1979 Cooper ....................... 523/461
4,460,719 A * 7/1984 Danville ..................... 523/508
4,771,177 A * 9/1988 Brown ................... 250/363 R
4,882,494 A 11/1989 Rogers et al. ......... 250/363.09

FOREIGN PATENT DOCUMENTS

RU 2082236 C1 * 6/1997 ............ G21G/4/06

* cited by examiner

*Primary Examiner*—Jack Berman
*Assistant Examiner*—Kalimah Fernandez
(74) *Attorney, Agent, or Firm*—Stephen R. May; Douglas E. McKinley, Jr.

(57) ABSTRACT

Disclosed is a is an improved flood source, and method of making the same, which emits an evenly distributed flow of energy from a gamma emitting radionuclide dispersed throughout the volume of the flood source. The flood source is formed by filling a bottom pan with a mix of epoxy resin with cobalt-57, preferably at 10 to 20 millicuries and then adding a hardener. The pan is secured to a flat, level surface to prevent the pan from warping and to act as a heat sink for removal of heat from the pan during the curing of the resin-hardener mixture.

16 Claims, 2 Drawing Sheets

QUALITY ASSURANCE FLOOD SOURCE AND METHOD OF MAKING

This invention was made with Government support under Contract DE-AC0676RLO1830 awarded by the U.S. Department of Energy. The Government has certain rights in the invention.

FIELD OF THE INVENTION

The present invention relates generally to flood sources used in imaging systems. Specifically, the present invention is an improved flood source, and method of making the same, which emits an evenly distributed flow of energy from a gamma emitting radionuclide dispersed throughout the volume of the flood source.

BACKGROUND OF THE INVENTION

The use of imaging systems that utilize energy from a gamma emitting radionuclides is a well known and well understood technique. The technique relies in one aspect upon those sources of energy, which are known in the trade as flood sources. Flood sources are typically used for checking the performance of nuclear medicine imaging systems. The size and shape of the flood sources are designed to closely match the size and shape of the gamma camera head. When this flood source is placed in the field of view of a nuclear medicine gamma camera, the flood ideally presents a uniform level of activity that produces a uniform gray image in the camera field-of-view. Defects in the image then appear as lighter or darker regions that indicate the locations of camera detectors that are not properly tuned. Thus, it is highly desirable to have the flood source present as uniform a level of activity as can be achieved.

Several investigators have attempted to solve the problems created by flood sources with less than optimum uniformity. For example, U.S. Pat. No. 4,882,494, issued Nov. 21, 1989 to Rogers, et. al. and entitled "Apparatus and method for flooding a nuclear imaging device with radiation from an imaging source" describes a method for correcting the non-uniformity in count density of nuclear imaging sources and an apparatus for carrying out the method. As described within the patent, the problem arises because standards with a stated certified non-uniformity of ±1% may actually have a much higher non-uniformity if standard National Electrical Manufactures Association ("NEMA") procedures are applied, since certified non-uniformity is based on a sampling of counts from the surface of the standard rather than on a total surface radiography. Also, since non-uniformity is quantified from counts in only two smoothed pixels (the maximum and the minimum), the method is potentially dependent on small flaws. Thus, to solve these problems the '494 patent proposes a method which includes the steps of positioning a nuclear imaging flood source beneath or adjacent a nuclear imaging device such as a gamma camera having a plurality of radiation sensing elements and moving the source in a controlled motion thereby blurring or diminishing the effects of any non-uniformities in the source, (i.e., insuring that each sensor or detector in the camera receives radiation from more than one radiation-emitting area of the source so that each sensor receives a more similar amount of light (radiation) than if the source was not moved). As taught by the '494 patent, the movement of the source can be accomplished over a long period of time, in a pattern, in a reproducible pattern, continuously, in a complex motion, or repetitively. Clearly, if the problems solved by such a method may be solved instead simply providing a uniform flood source, the type of expensive and elaborate equipment required by schemes such as that taught in the '494 patent may be eliminated. Thus, there exists a continued need for more uniform flood sources.

Several different designs of flood sources are available from a variety of commercial suppliers, and it may be easily appreciated that the market for flood sources is keenly competitive. As such, one may readily survey the state of the art in flood source design and manufacture simply by viewing the competitive landscape. For example, the Syncor® Corporation of 6464 Canoga Avenue, Woodlad Hills, Calif. currently distributes a variety of rectangular and circular flood sources made by DuPont that are claimed to have a coefficient of variation of less than one percent (1%) with less than three percent (3%) maximum deviation from the mean, a differential non-uniformity of less than one point eight percent (1.8%), and integral non-uniformity of less than two point five percent (2.5%). The Biodex Medical Systems Corporation of 20 Ramsay Road, Shirley, N.Y. 11967-0702 makes available $Co^{57}$ flood sources which it advertises as having non-uniformity of less than plus or minus one percent (1%) at two standard deviations. Thus, while the state of the art of flood source manufacture has produced flood sources having high levels of uniformity, there exists a need for improved methods for making flood sources and improved flood sources having even greater levels of $Co^{57}$ source uniformity.

OBJECTS

Accordingly, it is an object of the present invention to provide a flood source that presents a uniform radionuclide source distribution and emits energy having a high level of uniformity across the surface of the flood source.

It is a further object of the invention to provide a flood source placed within a shell having a bottom and sides defining a volume, wherein the flood source is made of a batch consisting of an epoxy resin of CY-507 resin and HY-2963 hardener in a ratio of resin to hardener from 2.5:1 to 3:1, and the epoxy resin is further mixed with a gamma emitting radionuclide having an energy between 90 keV and 375 keV, and at least one colored dye that provides a visual indicator of uniformity of the flood source batch and a cover fitting over the shell.

It is a further object of the invention to provide a flood source wherein the gamma emitting radionuclide is $Co^{57}$.

It is a further object of the invention to provide a flood source wherein the gamma emitting radionuclide is $Co^{57}$ and is distributed uniformly throughout the volume of the flood source batch.

It is a further object of the invention to provide a flood source wherein the gamma emitting radionuclide is $Co^{57}$ emits at least 5 millicuries.

It is a further object of the invention to provide a flood source wherein the gamma emitting radionuclide is provided in the chemical form $CoCl_2$.

It is a further object of the invention to provide a flood source wherein the shell and the cover are fabricated from ABS plastic.

It is a further object of the invention to provide a method of fabricating a flood source having the steps of providing a shell having a bottom and sides defining a volume, preparing a mixture of HY-2963 hardener with a gamma emitting radionuclide having an energy between 90 keV and 375 keV and at least one colored dye that provides a visual indicator of uniformity of the flood source batch, mixing the hardener, radionuclide, and colored dye until the colored dye is uniformly dispersed throughout said hardener, mixing the hardener, radionuclide, and color dye with an epoxy resin of CY-507 resin in a ratio of resin to hardener from 2.5:1 to 3:1 until the colored dye is uniformly dispersed throughout the epoxy resin, placing the mixture of hardener, radionuclide, color dye, and epoxy resin within the volume defined by the shell, allowing the mixture to cure, and sealing the shell with a cover fitting over the shell.

It is a further object of the invention to provide a method of fabricating a flood source wherein the shell is affixed to a level surface when the mixture of hardener, radionuclide, color dye, and epoxy resin is cured to prevent the shell from warping due to the heat of the curing reaction.

It is a further object of the invention to provide a method of fabricating a flood source wherein the shell is affixed to a level surface by means of a heat conductive clamp when the mixture of hardener, radionuclide, color dye, and epoxy resin is cured within the volume defined by the shell to prevent the shell from warping due to the heat of the curing reaction.

It is a further object of the present invention to provide a heat conductive clamp fabricated of aluminum.

It is a further object of the invention to provide a method of fabricating a flood source wherein the mixture of hardener, radionuclide, color dye, and epoxy resin is purged of bubbles prior to curing the mixture within the volume defined by the shell.

SUMMARY OF THE INVENTION

These and other objects of the invention are accomplished through the present invention which provides an improved design for flood shells featuring a durable and attractive vacuum-formed ABS plastic outer shell, and a durable and uniform epoxy resin filler of uniform thickness and which contains a uniform distribution of the radionuclide cobalt-57. When this flood source is placed in the field of view of a nuclear medicine gamma camera, the flood presents a uniform level of activity that produces a uniform gray image in the camera field-of-view. Defects in the image appear as lighter or darker regions that indicate the locations of camera detectors that are not properly tuned. Typically, the active volumes of the flood sources are approximately 24-inches round by ⅙ to ⅕-inch thick for a round flood source, or 16×24-inch by ⅙ to ⅕-inch thick for a rectangular flood source, although the present invention contemplates a wide variety of shapes and sizes for flood sources and the invention should be understood to encompass any flood source manufactured by the method described herein, regardless of its shape or size. The flood sources of the present invention are preferably formed with sturdy handles for carrying and positioning under the camera. Preferably, a lead-shielded shipping case is used to transport and store the flood source when it is not in use. The physical half-life of the cobalt-57 activity in the flood source of the present invention is approximately 271 days (9 months), meaning that the activity within the flood source decreases by one-half every nine months.

DETAILED DESCRIPTION OF THE PREFERRED EMBODIMENT OF THE PRESENT INVENTION

Figure 1:
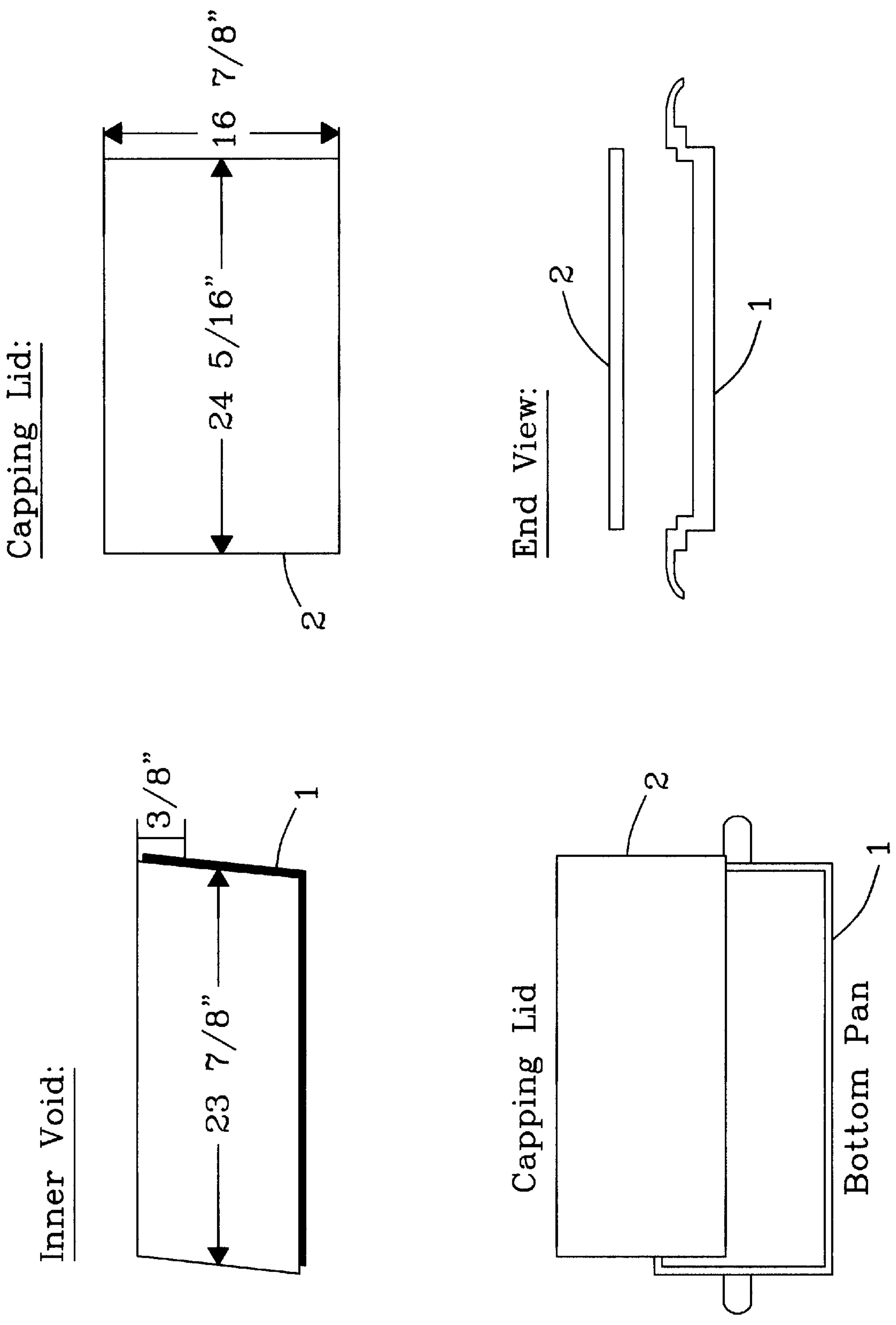
FIG. 1. Is an example of the flood source of the present invention having a rectangular shape.
Figure 2:
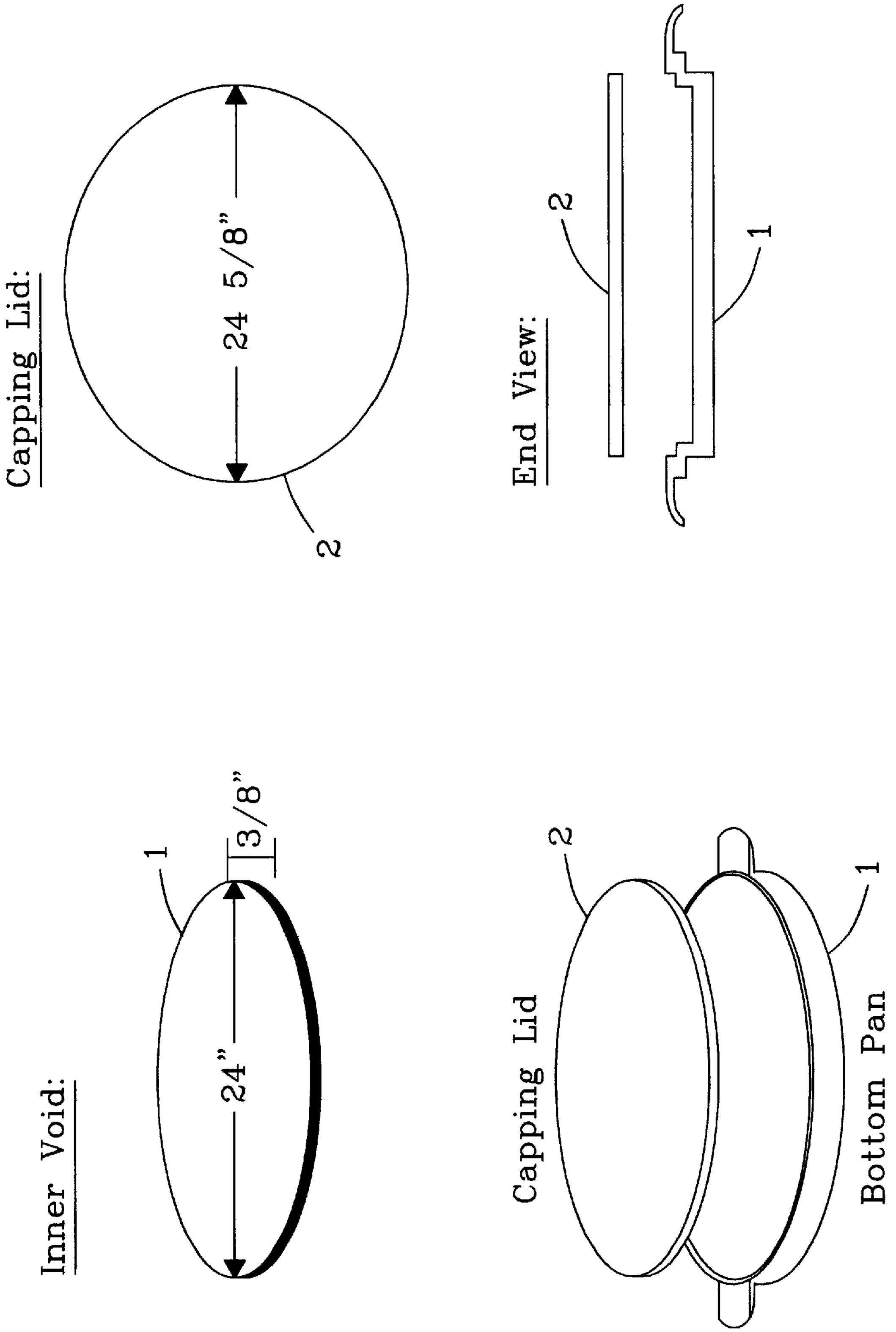
FIG. 2. Is an example of the flood source of the present invention having a circular shape.

While the general nature and operation of the present invention has been shown and described, a more in depth understanding of the invention may be acquired through a discussion of some preferred embodiments of the present invention. While the examples provided in these preferred embodiments are illustrative of the nature and operation of the present invention, those skilled in the art will recognize that the general principles demonstrated in the preferred embodiments are readily applicable in a wide variety of manner, all of which would fall within the contemplation of the present invention. Accordingly, the following description of the present invention should only be regarded as illustrating the practice of the present invention, and the invention should not be understood as limited to the particular examples set forth herein, but rather should be broadly construed as including other variations and combinations within the spirit and scope of the claims set forth in the concluding portion of this specification In the preferred embodiment of the present invention, the flood source consists of an outer shell of ABS plastic that contains an inner epoxy resin containing a uniform mixture of radioactive cobalt-57. The cobalt-57 emits penetrating gamma rays that are detected by a nuclear medicine camera. As shown in FIGS. 1 and 2, the shell consists of a bottom pan 1 and top capping lid 2. The bottom pan 1 contains an inner void that is preferably 16×24-inches by about ⅜-inch deep for a rectangular shape as shown in FIG. 1, or 24-inches in diameter for a round shape as shown in FIG. 2. While not meant to be limiting, the bottom pan 1 is preferably vacuum-formed from 0.187-inch thick ABS plastic sheeting. The bottom pan 1 is molded to accept a lid 2 consisting of a flat sheet of ABS plastic, preferably cut to exact dimensions to insure a tight-fit with the bottom pan 1. Preferably, and while not meant to be limiting, the bottom pan 1 has vacuum-formed handles, curved downward for strength.

The bottom pan is filled with a radioactive epoxy resin by first mixing an epoxy resin with cobalt-57, preferably at 10 to 20 millicuries, or any other gamma-emitting radionuclide having an energy preferably between 90 keV and 375 keV, which is then placed in the bottom pan 1 of the shell. The bottom pan 1 is then secured to a flat, level surface (not shown), using any suitable means known to those having skill in the art, including but not limited to clamps, screws, or presses. Preferably, the bottom pan 1 is secured using an aluminum screw-down clamp that completely surrounds the pan 1 and prevents the pan 1 from warping. The aluminum clamp also serves as a leveling device to ensure a completely uniform epoxy fill thickness. The aluminum clamp also acts as a heat sink for removal of heat from the pan 1 during the curing of the resin-hardener mixture.

The epoxy is formed using Ciba-Geigy GY-507 resin and Ciba-Geigy HY-2963 hardener, preferably in a ratio of between 2.5:1 to 3.0:1 (resin to hardener). These ratios keep the exothermic heat of reaction low and allow the epoxy to dry and cool with minimum warpage of the bottom pan 1. More hardener raises the curing temperature and decreases the hardening time, whereas more resin decreases the curing temperature but increase the hardening time. The resin shrinks when it cures; reduction in volume is compensated for by increasing the starting volume. The cobalt-57 radionuclide, preferably provided as $CoCl_2$, is miscible in the hardener of the epoxy, but not in the resin. Therefore, the Co-57 is preferably mixed well with the HY-2963 hardener before it is added to the GY-507 resin. A uniform mixing of the radionuclide is achieved by adding the Co-57 to one-half the hardener. A small amount of color dye is added and stirred with the radionuclide until the color of the mixture appears uniform. The other half of the hardener is then added and the mixture is stirred well again until the new color is uniform. This method of mixing minimizes the amount of air that can be introduced into the epoxy. The hardener mixture and the epoxy resin are mixed together; color dye is added again and mixed until uniform color indicates a completely homogenous mixture. Slow mixing allows gas bubbles that form to be released at the surface. The epoxy requires 72 to 96 hours to completely harden and cure. The lid 2 is placed over the pan 1 and is sealed, preferably with ABS cement, forming a complete enclosure of the radionuclide-epoxy resin. Ciba-Geigy resin and hardener are commercially available from the manufacturer, or from a commercial distributer (Dorsett & Jackson Inc., Los Angeles). GY-507 resin is based on C-G (Ciba-Geigy) resin GY-6010. GY-6010 has a viscosity of 11,000 to 14,000 centipoise. GY-6010 is diluted with CGE to a viscosity of 500 to 700 centipoise. This is the preferred viscosity of the resin as practiced by the present invention. Several other manufacturers make epoxy bases that are equivalent to GY-6010 and consequently also make GY-507 equivalents. These equivalents should be considered as included in the present invention. The Shell equivalent to GY-6010 is number 828. The Dow equivalent is DER-331. The Shell equivalent to GY-507 is their EPON resin 813. The Dow equivalent to GY-507 is their DER-325. An equivalent to GY-507 may be readily manufactured by starting with a base resin equivalent to GY-6010 and diluting it to the 500 to 700 centipoise range with CGE. Other suitable epoxy resins having even lower viscosity for the casting of flood sources based on GY-6010 or Shell 828 or DER-331 or another equivalent base epoxy resin are also acceptable, and may even be preferable. The preferred C-G hardener HY-2963 is a cyclo-aliphatic hardener. The Shell equivalent is 3370 or 3374. The Dow equivalent hardeners are DEH-82 or DEH-84 or DEH-85.

The epoxy resins described herein provide a highly uniform thickness and Co-57 concentration. The resin gives strength to the shell and is unbreakable under normal use. This design completely seals the radionuclide source and prevents any leakage of radioactive material from the flood source. Wipe-testing of the bare epoxy of examples of the present invention prepared according to the foregoing method and containing cobalt-57 showed that no activity was transferred from the epoxy resin to the smear.

While the preferred embodiment of the present invention has been shown and described, the invention should not be understood as limited to the particular examples set forth herein. Rather, as many variations and modifications will be readily apparent to those having skill in the art, the invention should be broadly construed as including all such other variations and modifications falling within the spirit and scope of the claims which follow and conclude this specification.

We claim:

1. A flood source comprising:

a) a shell having a bottom and sides defining a volume, b) a flood source batch having an epoxy resin of GY-507 resin and HY-2963 of hardener in a ratio of resin to hardener from 2.5:1 to 3:1, said epoxy resin mixed with a gamma emitting radionuclide having an energy between 90 keV and 375 keV, and at least one colored dye that provides a visual indicator of uniformity of the flood source batch; and c) a cover fitting over said shell.

2. The flood source of claim 1 wherein said gamma emitting radionuclide is $Co^{57}$.

3. The flood source of claim 1 wherein said gamma emitting radionuclide is $Co^{57}$ and is distributed uniformly throughout the volume of said flood source batch.

4. The flood source of claim 1 wherein said gamma emitting radionuclide is $Co^{57}$ emitting at least 5 millicuries.

5. The flood source of claim 1 wherein said gamma emitting radionuclide is provided as $CoCl_2$.

6. The flood source of claim 1 wherein said shell and said cover are fabricated from ABS plastic.

7. A method of fabricating a flood source comprising the steps of:

a) providing a shell having a bottom and sides defining a volume, b) preparing a mixture of HY-2963 hardener with a gamma emitting radionuclide having an energy between 90 keV and 375 keV and at least one colored dye that provides a visual indicator of uniformity of the flood source batch;

c) mixing said hardener, radionuclide, and colored dye until the colored dye is uniformly dispersed throughout said hardener, d) mixing said hardener, radionuclide, and colored dye with an epoxy resin of GY-507 resin in a ratio of resin to hardener of from 2.5:1 to 3:1 until said colored dye is uniformly dispersed throughout said epoxy resin, e) placing the mixture of said hardener, radionuclide, colored dye, and epoxy resin within said volume defined by said shell, f) allowing said mixture of said hardener, radionuclide, colored dye, and epoxy resin to cure, and g) sealing said shell with a cover fitting over said shell.

8. The method of claim 7 wherein said gamma emitting radionuclide is provided as $Co^{57}$.

9. The method of claim 7 wherein said gamma emitting radionuclide is provided as $Co^{57}$ having at least 5 millicuries.

10. The method of claim 7 wherein said gamma emitting radionuclide is provided as $CoCl_2$.

11. The method of claim 7 wherein said shell and said cover are provided as fabricated from ABS plastic.

12. The method of claim 7 further comprising the step of affixing said shell to a level surface when said mixture of said hardener, radionuclide, color dye, and epoxy resin is cured within said volume defined by said shell.

13. The method of claim 7 further further comprising the step of affixing said shell level surface by means of a heat conductive clamp when said mixture of said hardener, radionuclide, color dye, and epoxy resin is cured within said volume defined by said shell.

14. The method of claim 13 further wherein said heat conductive clamp is provided as aluminum.

15. The method of claim 7 wherein said mixture of said hardener, radionuclide, color dye, and epoxy resin is purged of bubbles prior to curing said mixture within said volume defined by said shell.

16. The flood source fabricated according to the method of claim 7.

* * * * *

UNITED STATES PATENT AND TRADEMARK OFFICE

CERTIFICATE OF CORRECTION

PATENT NO. : 6,489,617 B1 
DATED : December 03, 2002
INVENTOR(S) : Darrell R. Fisher, David L. Alexander and Stanley Satz It is certified that error appears in the above-identified patent and that said Letters Patent is hereby corrected as shown below:

Title page,
Item [73], Assignee, please change "Battelle Memorial Institute, Richland, WA (US)" to -- Battelle Memorial Institute, a part interest, Richland, WA (US) --.

Signed and Sealed this

Eleventh Day of March, 2003

JAMES E. ROGAN
*Director of the United States Patent and Trademark Office*